United States Patent [19]
Jin

[11] Patent Number: 5,880,858
[45] Date of Patent: Mar. 9, 1999

[54] METHOD OF AUTO-CROPPING IMAGES FOR SCANNERS

[75] Inventor: Yuan-Chang Jin, Hsinchu, Taiwan

[73] Assignee: Mustek Systems Inc., Hsin-Chu, Taiwan

[21] Appl. No.: 1,979

[22] Filed: Dec. 31, 1997

[51] Int. Cl.$^6$ .................................................... H04N 1/04
[52] U.S. Cl. ........................ 358/487; 358/453; 358/465
[58] Field of Search .................................... 358/465, 466, 358/487, 474, 453, 462, 467; 348/64; 382/169, 172, 175, 176

[56] References Cited

U.S. PATENT DOCUMENTS 5,270,688  12/1993  Dawson et al. ......................... 345/150

Primary Examiner—Scott Rogers
Assistant Examiner—Jerome Grant, II
Attorney, Agent, or Firm—Ladas & Parry

[57] ABSTRACT

A method of auto-cropping images appropriate for scanners is disclosed, that features use of the image-division method for carrying out auto-cropping. According to the method, the images of the objects after pre-scanning can be auto-cropped, and therefore do not require further manual operation. The interference due to the background color of the cover and other redundant images can also be reduced. Furthermore, the present invention is also appropriate for scanning positive and negative films, and films are disposed on frames can be scanned properly.

9 Claims, 7 Drawing Sheets

METHOD OF AUTO-CROPPING IMAGES FOR SCANNERS

BACKGROUND OF THE INVENTION

1. Field of the Invention

The present invention generally relates to an image-processing method. More particular, the present invention relates to a method of auto-cropping images for scanners, accordingly the images prescanned by a scanner can be located and cropped automatically without further manual operation by the user.

2. Description of the Related Art

Generally speaking, after putting objects in a scanner, for example documents and drawings, the scanner prescans the objects and displays the images of the objects in a preview window. For conventional scanners, users must crop the prescanned images manually by using pointers such as a mouse to select the required images. Cropping the images manually is very inconvenient. Especially, in the case of scanners with batch-scan functions, users waste a great deal of time cropping the images, while batch-scanning the objects. Without an auto-cropping function, users are subject to inconvenience and work efficiency is degraded.

SUMMARY OF THE INVENTION

Accordingly, the object of the present invention is to provide a method of auto-cropping images for scanners, such that the prescanned images displayed in a preview window can be auto-cropped. Therefore, users don't have to crop the images, thus increasing convenience and efficiency.

The disclosed method can be applied to scanners with or without covers. In addition, interference due to the background color of the cover can also be solved.

Furthermore, the present invention is appropriate for scanners that scan positive films and negative films, and films with or without frames can also be determined and the images selected properly.

In order to achieve the above objects, one method of auto-cropping images for scanners according to the present invention is proposed, wherein the steps are as follows:

(a) provide a prescanned image, wherein the pixels of the image are processed by the image division method to obtain at least a low threshold and a high threshold;

(b) compare the pixels in every horizontal row with the low threshold, wherein the number of any pixel that is larger than the low threshold is recorded respectively to obtain a dot-intension number for every row, and the dot-intension number of every row is compared with a limit, whereby the rows with dot-intension numbers that exceed the limit are cropped, and the prescanned image is divided into several image regions;

(c) compare the pixels of every vertical column in every divided image region with the low threshold, wherein the number of the pixels that exceed the low threshold is recorded respectively to obtain a dot-intension number for every column, and the dot-intension number of every column is compared with the limit, whereby the columns with dot-intension numbers that exceed the limit are cropped, and every one of the divided image region is further divided into several cropped regions; and (d) iterate steps (b) and (c) to further divide the cropped regions horizontally and vertically, wherein the iterating process stops when every horizontal and vertical division of the cropped regions can not form any new divided region.

In order to achieve the above objects, another method of auto-cropping images for scanners wherein that must crop films with or without frames is also proposed, wherein the steps are as follows:

(I) the frame detection step comprises the following sub-steps: (1a) processing all pixels in a preview window to obtain a low threshold and a high threshold; (1b) comparing the pixels in every horizontal row with the low threshold, and recording the number of pixels that exceed the low threshold respectively to obtain a dot-intension number with respect to every row, then comparing the dot-intension number of every row with a limit, and cropping the rows with dot-intension numbers that exceed the limit, and recording the row number of every cropped regions; (1c) transforming the size of the regions for disposing films into pixel dots; and (1d) comparing every one of the horizontal row numbers recorded with the pixel dot-number of the region for disposing a film, and if at least two of the horizontal row numbers and the dot-number have a difference that falls within a specific range, the frames are then detected.

After confirming that the films are disposed in frames, the auto-cropping step is carried out, comprising the following sub-steps: (2a) processing the pixels of the prescanned image by the image division method to obtain at least a low threshold and a high threshold; (2b) comparing the pixels in every horizontal row with the low threshold, and recording the number of pixels that exceeds the low threshold respectively to obtain a dot-intension numbers with respect to every row, then comparing the dot-intension number of every row with a limit, and cropping the rows with dot-intension numbers that exceed the limit, and dividing the prescanned image into several divided image regions; (2c) comparing the pixels in every vertical column of every the divided image region with the low threshold, and recording the number of pixels that exceed the low threshold respectively to obtain a dot-intension number with respect to every column, and comparing the dot-intension number of every column with the limit, thereby the columns with dot-intension numbers exceeding the limit are cropped, and further dividing every divided image region into several cropped regions; (2d) iterating steps 2b and 2c to further divide the cropped regions horizontally and vertically, wherein the iterating process stops when every horizontal and vertical division doing to the cropped regions can not form any new divided region; and (2e) comparing the pixels in every cropped region with the high threshold, and recording the number of the pixels that exceed the high threshold to serve as a sum number, and if the sum number of every cropped region exceeds the total pixel dots in a cropped region for a certain proportion, then no film is disposed at the cropped position, whereby every cropped region can be checked sequentially to locate the correct position of the films; wherein if in step I the frames are not detected, then the steps described steps 2a~2d in process II are carried out to crop the film regions properly.

BRIEF DESCRIPTION OF THE DRAWINGS

Other objects, features and advantages of the present invention will become apparent by way of the following detailed description of the preferred but non-limiting embodiment. The following description is made with reference to the accompanying drawings.

DETAILED DESCRIPTIONS OF THE INVENTION

First Embodiment

Figure 1A:
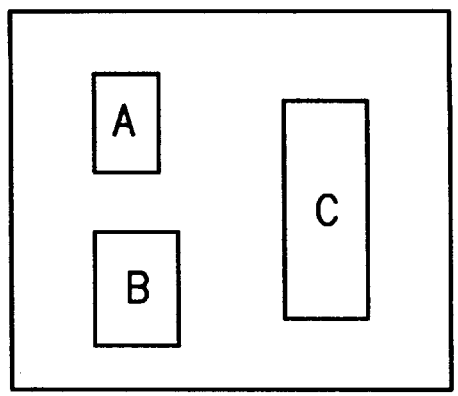
FIG. 1A to FIG. 1E illustrate the process of the first embodiment according to the present invention.

Referring to FIG. 1A, after a scanner prescans some objects A, B, and C, the images of A, B, and C are displayed in a preview window. For conventional scanners, users must crop the images of objects A, B, and C with additional steps.

Figure 2:
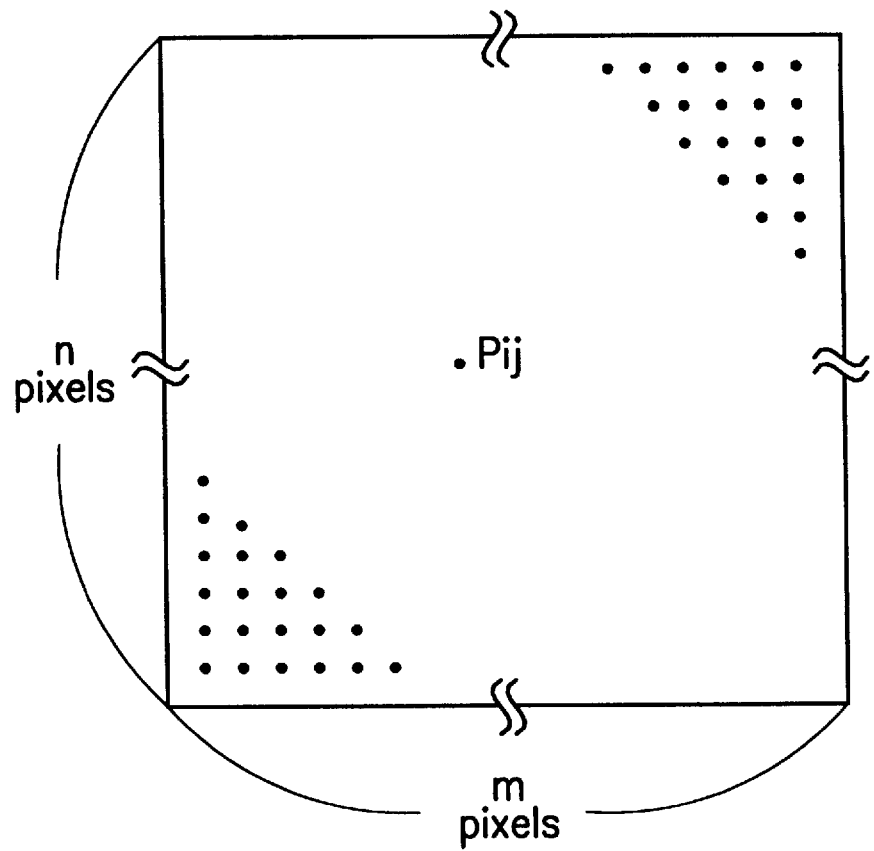
FIG. 2 illustrates the pixel distribution in a preview window of a scanner.

FIG. 2 illustrates the pixel distribution in a preview window of a scanner. In the first embodiment, the horizontal resolution of the preview window has m pixels, and the vertical resolution of the preview window has n pixels. Any pixel in the preview window is indicated as $P_{ij}$, wherein i, j indicates the coordinates and $1 \leq i \leq m$, $1 \leq j \leq n$. The images in the preview window consist of the pixels.

In the first embodiment, after prescanning the objects A, B, and C, the images A, B, and C are displayed in a preview window, as shown in FIG. 1.

After prescanning, the steps for completing the auto-cropping method are as follows.

Step (a)

An image-division method is carried out to process the pixels to obtain at least a low threshold and a high threshold. The image-division method will be described in another section.

Step (b)

In every horizontal row, the pixels are compared with the low threshold, and the number of pixels that exceed the low threshold is recorded respectively. Therefore, each row has a corresponding dot-intension number. The dot-intension number in every row is compared with a limit, thereby selecting the rows with dot-intension numbers that exceed the limit.

Figure 1B:
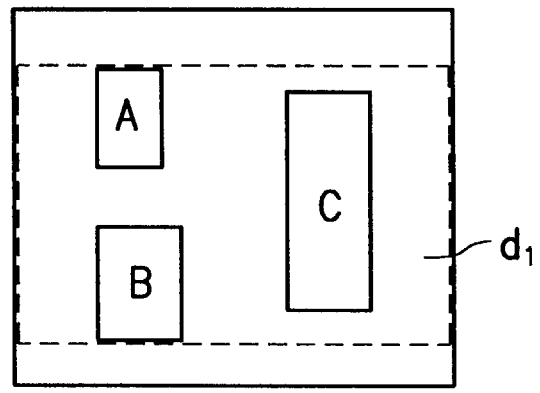

In the first embodiment, a cropped region $d_1$ is obtained, as shown in FIG. 1B.

Step (c)

Figure 1C:
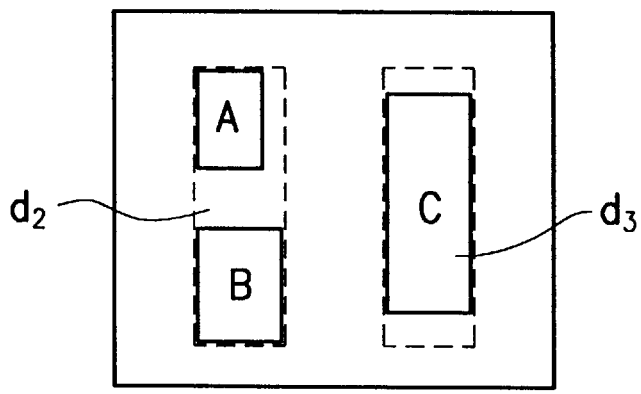

Next, the cropped region $d_1$ serves as a region for processing. In every vertical column of the region $d_1$, the pixels are compared with the low threshold, and the number of pixels that exceed the low threshold is recorded respectively. Therefore, each column has a corresponding dot-intension number. Then, the dot-intension number in every column is compared with the limit, thereby selecting the columns with dot-intension numbers that exceed the limit. Consequently, the region $d_1$ is further divided into regions $d_2$ and $d_3$ as shown in FIG. 1C.

Step (d)

Figure 1D:
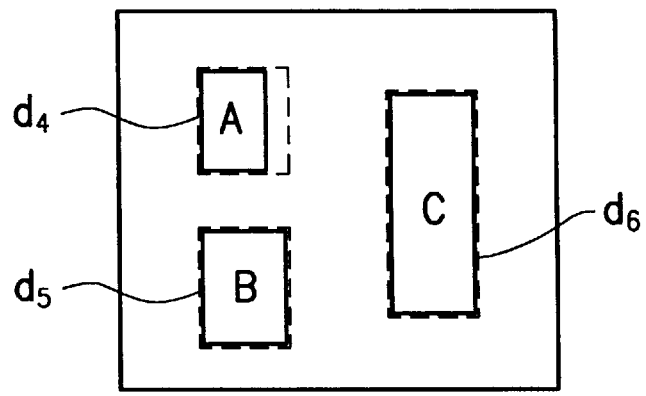

Then, the regions $d_2$ and $d_3$ are used as the processing regions, and the above step (a) is carried out again. In every horizontal row of the regions $d_2$ and $d_3$ the pixels are compared with the low threshold, and the number of pixels that exceed the low threshold is recorded respectively. Therefore, each row has a corresponding dot-intension number. The dot-intension number in every row is compared with a limit, thereby selecting the rows with dot-intension numbers that exceed the limit. Consequently, the regions $d_2$ and $d_3$ are divided into three regions $d_4$, $d_5$, and $d_6$, as shown in FIG. 1D. It is obvious that the images of objects B and C are well cropped as the regions $d_5$ and $d_6$.

Figure 1E:
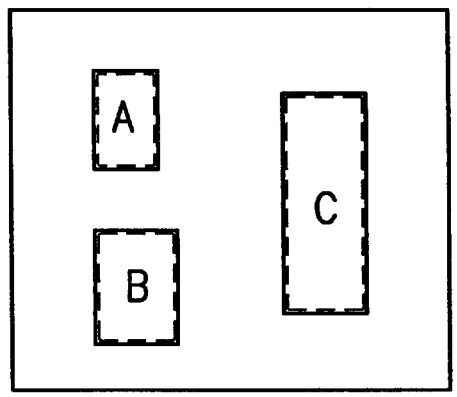

Next, the regions $d_4$, $d_5$, and $d_6$ are used as the regions for processing, and the above step (b) is carried out again. In every vertical column of the regions d4, d5, and d6, the pixels are compared with the low threshold, and the number of pixels that exceed the low threshold is recorded respectively. Therefore, each column has a corresponding dot-intension number. Then, the dot-intension number in every column is compared with the limit, thereby selecting the columns with dot-intension numbers that exceed the limit. Finally, the images of objects A, B, and C are cropped properly. For the final cropped regions corresponding to the images of A, B, and C, further division in these regions can not be formed, even when the steps (a) and (b) are repeated. Consequently, auto-cropping processing is completed, as shown in FIG. 1E.

The image division method mentioned above is described hereinafter.

In general, a fixed threshold is adopted in the conventional image-division method. The image data are compared with the fixed threshold to divide the image data into two groups.

The image-division method applied in the present invention is different from the conventional one. Its processing steps will be described as follows.

The image-division method comprises the following steps:

(a) First, a plurality of initial values $a_1 \sim a_n$ are selected corresponding to a plurality of sets $S_1 \sim S_n$, serving as central characteristic values of the above sets, where $a_1 < \ldots < a_n$.

(b) After calculating the color values of every one of the pixels $P_{ij}$ in the preview window (FIG. 2), for example taking the average of the color values, the pixel characteristic values corresponding to all pixels are obtained respectively.

(c) The differences between every pixel characteristic value and every central characteristic value are calculated and then absolute values of the differences are taken. The central characteristic value most close to the pixel characteristic value is selected, and then the pixel characteristic value is assigned to the set corresponding to the central characteristic value. Therefore, all the pixel characteristic values are assigned to their corresponding sets.

(d) The pixel characteristic values in every set $(S_1 \sim S_n)$ are averaged to obtain corresponding mean characteristic values $T_1 \sim T_n$ respectively.

(e) The mean characteristic values $T_i$ are compared with the central characteristic values $a_i$ respectively (where, i=1~n). If every absolute value $|T_i - a_i|$ is within a specific value, for example 1, then the minimal mean characteristic value $T_1$ will replace the low threshold, and the maximal mean characteristic value $T_n$ will replace the high threshold, such that the object for image-division is achieved. If the absolute value $|T_i - a_i|$ is greater than the specific value, then the central characteristic values $a_1 \sim a_n$ are replaced by the mean characteristic values $T_1 \sim T_n$, and the steps (c), (d), and (e) are carried out again.

In general, the image 2-division method can be carried out by providing two initial values, for example, let $a_1$ and $a_2$ equal 3 and 250. If the image intension requires being divided more finely, more initial values can be added between the initial values $a_1$ and $a_2$. Therefore, the image-division method according to the present invention can provide suitable low threshold and high threshold according to the characteristic of the images.

Second Embodiment

The background color of the cover of a scanner usually is not black, such that the prescanned images will be subject to interference by the background color of the cover. In addition, the extra or redundant images such as the connection lines will be scanned and appear in the preview window.

The above-mentioned problems can be solved according the method described hereinafter.

Figure 3A:
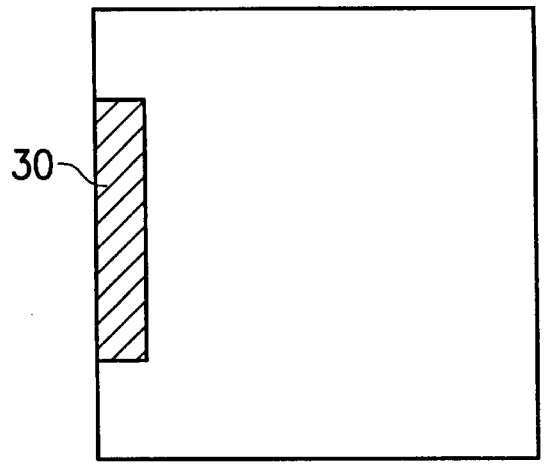
FIG. 3A to FIG. 3F illustrate the process of the second embodiment according to the present invention.

First, a background image is obtained by scanning the closed cover without any objects in the scanner. The background image is shown in FIG. 3A, wherein the redundant images such as connection lines are indicated as numeral 30.

Figure 3B:
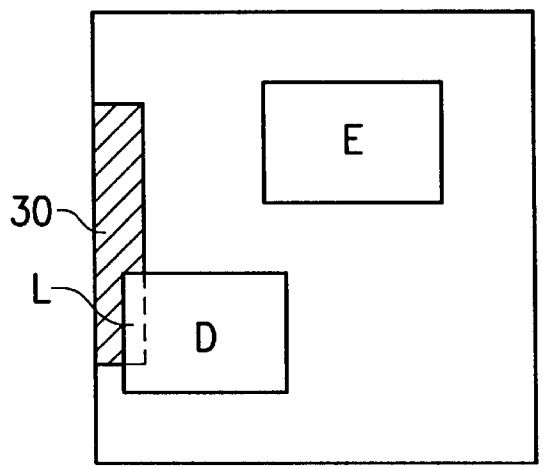
Figure 3C:
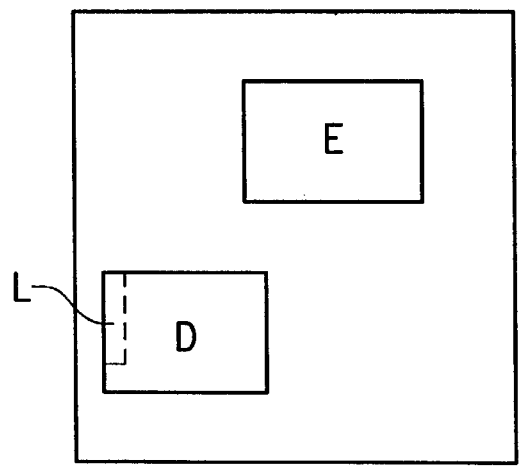

Next, objects D and E are scanned by the scanner, and the prescanned image is shown in FIG. 3B. The image in FIG. 3B and the background image in FIG. 3A are processed by subtracting to cancel out the interference due to redundant image and background color of the cover. The result image, which serves as a prescanned image, is shown in FIG. 3C.

There is an overlapping portion L of the object D and the redundant image (for example, connection lines).

Figure 3D:
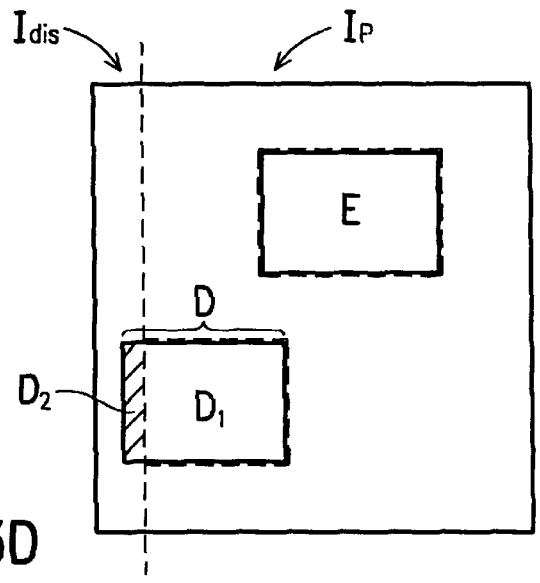

In order to further reduce the disturbance due to the overlapping portion L, a portion of the prescanned image $I_{dis}$ is masked out with the width of some pixel dots. Thus, the object D is divided into two parts $D_1$ and $D_2$. The width of the masked image $I_{dis}$ should be larger than that of connection lines. For high resolution, the width of the masked image can be 18 pixel dots. For low resolution, the width of the mask image can be 9 pixel dots. Then, the method described in the first embodiment is carried out to process the unmasked image $I_p$, such that the image of objects $D_1$ and E are cropped automatically, as shown in FIG. 3D.

Figure 3E:
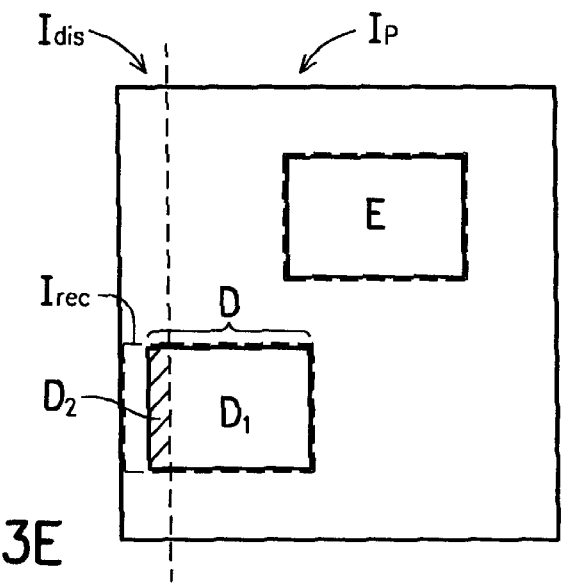
Figure 3F:
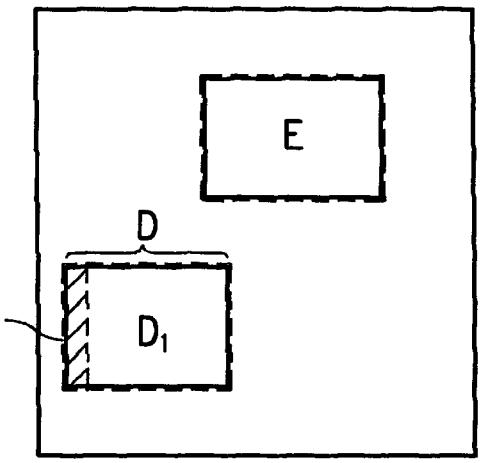

Finally, the masked image $I_{dis}$ is processed to crop the object $D_2$. The cropped region of the object $D_1$ is expanded toward the masked region $I_{dis}$ dis horizontally or vertically, such that the object $D_2$ at the masked image region $I_{dis}$ is cropped as a recovery region $I_{rec}$. In the second embodiment, the cropped region of the object $D_1$ is expanded toward the masked region $I_{dis}$ horizontally, as shown in FIG. 3E. Then, the recovery region $I_{rec}$ is processed according to the method described in the first embodiment. Next, the object $D_2$ can be cropped properly, thus completing the cropping of the objects D and E, as shown in FIG. 3F.

Third Embodiment

Figure 4A:
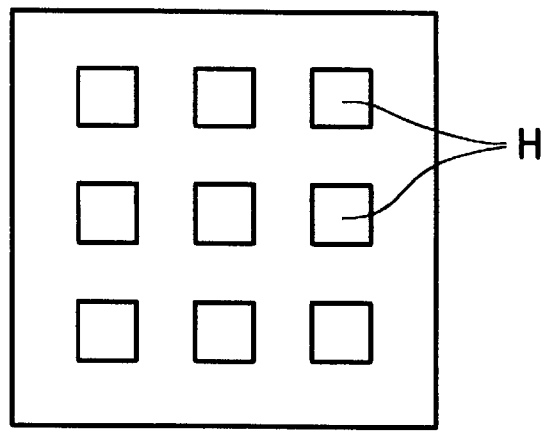
FIG. 4A to FIG. 4E illustrate the process of the third embodiment according to the present invention.

When scanners scan films, the film usually disposed in a frame for convenience. FIG. 4A illustrates a frame for loading films, the portions H is where the film is disposed.

While scanning positive films without using a frame, the background color of prescanned image is white, and therefore a reversal (complement) operation is carried out to the pixels in the preview window. Then, the prescanned image after carrying out a reversal operation is processed according to the auto-cropping method described in first embodiment.

While scanning negative films without using a frame, the background color of the prescanned image is black, and thus it is processed according to the auto-cropping method described in first embodiment, without carrying out a reversal operation.

In a scanner for scanning films, the tube (light source) is disposed in the cover, and while scanning positive (negative) films, the positions of the frames in the preview images are black (white). Therefore, the general method described above can not be applied for scanning positive and negative films. Before scanning films, films with or without frames must be distinguished.

Frame Detection Method

The method for detecting frames will be described in detail, with reference to FIG. 4A to FIG. 4E. The image of films disposed in a frame after scanning is shown in FIG. 4A, wherein the frame portion is black or white depending on the type of film (positive or negative).

Figure 4B:
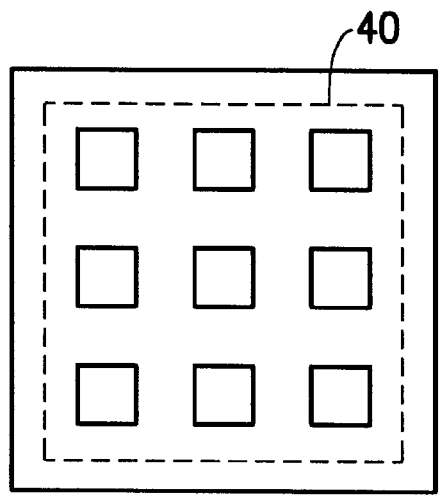

In general, the frame can not cover the scanning window of a scanner completely, therefore, the light source will be transparent in the part of the region uncovered by the frame. This light leakage will interfere with the detection of the frame. To reduce the interference, the margin of the frame is masked out, and the remaining image 40 enclosed by a dashed line is used for frame detection, as shown in FIG. 4B. If the films are negative, the image 40 has to be processed by carrying out a reversal operation first, and the frame detection then follows. If the films are positive, a reversal operation is not required for processing the image 40, and the frame detection is carried out directly.

Figure 4C:
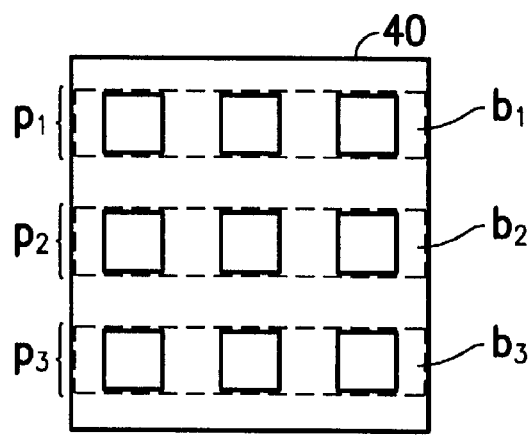

The steps (a) and (b) described in first embodiment are used to process the image 40 to select the rows with dot-intension numbers that exceed the limit. For the third embodiment, three regions b1, b2, and b3 are cropped, as shown in FIG. 4C. (The number of the cropped regions depends on the type of frame.)

In a frame, the portions H for disposing films have specific sizes. In the third embodiment, the size is about 3.6 cm, for example. Therefore, the pixel dot-number after mapping to the preview window can be expressed as pc= (3.6/2.54)×prescan_dpi, wherein prescan_dpi is the prescanned resolution (dots per inch) of the scanner.

In FIG. 4C, the cropped regions b1, b2, and b3 have corresponding pixel dots p1, p2, and p3 along their vertical columns respectively. If at least two pixel dots conform to the following condition (pc-sn)$\leq$pi$\leq$(pc+sn), then the frame is detected, wherein i=1~3, and sn is a specific number, here sn is 3 for example.

Auto-cropping method while a frame is detected

After detecting a frame, if the films are positive, then the prescanned image is processed by the auto-cropping method. If the films are negative, then the reversal of prescanned image must be carried out first, and then the prescanned image after reversal is processed by auto-cropping method.

The auto-cropping method applied to positive films is similar to that applied to negative films, therefore, the one applied to positive films is described hereinafter.

Figure 4D:
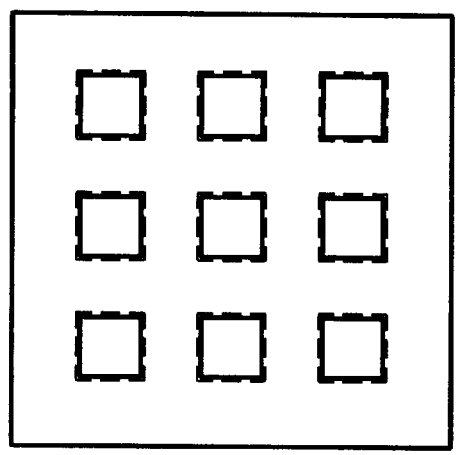

First, the prescanned image is processed by the auto-cropping method described in the first embodiment, and all the positions where films can be disposed are cropped, as shown in FIG. 4D.

Figure 4E:
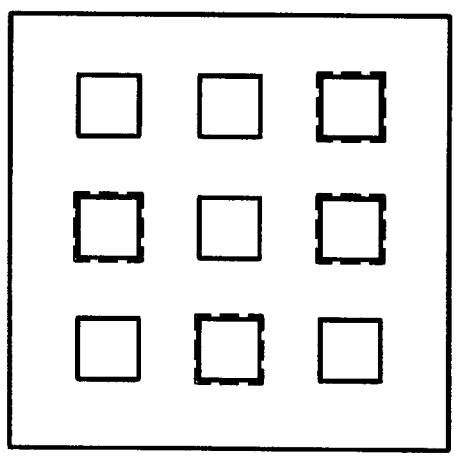

Because not all the positions are disposed with films, an examination process is required to get rid of the cropped positions without films disposed. The process is described as follows:

The image pixels of every cropped position are compared with a high threshold, the numbers of the pixels that exceed the high threshold are recorded as a sum number. If the sum number of a cropped position is larger than the total pixel dots in a cropped position for a certain proportion, then no film is disposed at the cropped position. By this way, every cropped position can be checked sequentially, and therefore the correct position of the film can be cropped properly, as shown in FIG. 4E.

While the invention has been described in terms of what is presently considered to be three most practical and preferred embodiments, it is to be understood that the invention need not be limited to the disclosed embodiments.

On the contrary, it is intended to cover various modifications and similar arrangements included within the spirit and scope of the appended claims, the scope of which should be accorded the broadest interpretation so as to encompass all such modifications and similar structures.

What is claimed is:

1. A method of auto-cropping images for scanners comprising the steps of:
   a. providing a prescanned image wherein the pixels of said image are processed by an image-division method to obtain at least a low threshold and a high threshold;
   b. comparing the pixels in every horizontal row with said low threshold, wherein the number of the pixels that exceed said low threshold is recorded respectively to obtain a dot-intension number for every row, and the dot-intension number of every row is compared with a limit, whereby cropping the rows with a dot-intension number that exceeds said limit, and dividing the prescanned image into several divided image regions;
   c. comparing the pixels in every vertical column of every said divided image region with said low threshold, and the number of the pixels that exceed said low threshold is recorded respectively to obtain a dot-intension number for every column, then the dot-intension number of every column is compared with said limit, and the columns with dot-intension numbers that exceed said limit are cropped, and every said divided image region is further divided into several cropped regions; and
   d. iterating steps b and c to further divide the cropped regions horizontally and vertically, and stopping the iterating process when every horizontal and vertical division in the cropped regions can not form any new divided region.

2. The method as claimed in claim 1, wherein said image-division method comprises the steps of:
   a. selecting a plurality of different initial values with respect to a plurality of sets one to one, serving as the central characteristic values of said sets;
   b. calculating the color values of every pixel to obtain the pixel characteristic values corresponding to every pixel;
   c. calculating every said pixel characteristic value with said central characteristic values by subtraction and continuously taking the absolute values thereof, whereby selecting the central characteristic value closest to said pixel characteristic value, and by this way, every pixel characteristic value is assigned to the corresponding set of central characteristic values, which is closest to the pixel characteristic value;
   d. averaging the pixel characteristic values in every set respectively to obtain corresponding mean characteristic values; and
   e. comparing every said mean characteristic value in every set with the corresponding central characteristic value, wherein if every difference is within a specific range, then the minimal mean characteristic value serves as said low threshold, and the maximal mean characteristic value serves as said high threshold, and if at least one of the differences exceeds said specific range, then every central characteristic value of said sets is replaced by said mean characteristic values of said sets and the steps c, d, and e are iterated.

3. The method as claimed in claim 1, when the scanners have covers, said method further comprises the steps of:
   a. prescanning a background image and storing it, before putting any objects in a scanner;
   b. detecting whether said cover is closed or not, wherein if not closed, then the steps a~d in claim 1 are carried out to auto-crop the images, and if closed, then the process comprises the following steps:
      i. calculating the background image and a prescanned image by subtraction; and
      ii. carrying out the steps a~d in claim 1 to the image after subtraction to complete the auto-cropping process.

4. The method as claimed in claim 3, wherein, after carrying out step ii, the margin of said prescanned image is masked out first and then the step ii is carried out, and after completing the cropping of the unmasked region, the cropping regions are expanded toward the masked regions horizontally or vertically to crop the images in the masked regions serving as recovery regions, and the recovery regions are processed by step ii to crop the masked image, thereby completing the cropping of all images.

5. A method of auto-cropping images for scanners appropriate for scanning films with or without frames comprising the steps of:
   (I). confirming the type of the films first, and detecting frames, and if frames are detected, then step (II) is carried out;
   (II). preprocessing a prescanned image according to the film type, and carrying out the following steps:
      2a. processing the pixels of said prescanned image by the image-division method to obtain at least a low threshold and a high threshold;
      2b. comparing the pixels in every horizontal row with said low threshold, and recording respectively the number of the pixels that exceed said low threshold to obtain a dot-intension number for every row, then comparing the dot-intension number of every row with a limit, thereby cropping the rows with dot-intension numbers that exceed said limit, and dividing the prescanned image into several divided image regions;
      2c. comparing the pixels in every vertical column of every said divided image region with said low threshold, then respectively recording the number of the pixels that exceed said low threshold to obtain a dot-intension number for every column, then comparing the dot-intension number of every column with said limit, thereby cropping the columns with dot-intension numbers that exceed said limit, and further dividing every said divided image region into several cropped regions;
      2d. iterating steps 2b and 2c to further divide the cropped regions horizontally and vertically, and stopping the iterating process when every horizontal and vertical division of the cropped regions can not form any new divided region; and
      2e. comparing the pixels in every cropped region with said high threshold, and recording the number of the pixels that exceed the high threshold to serve as a sum number, and if said sum number of every cropped region is greater than the total of pixel dots in a cropped region for a certain proportion, then no film is disposed at the cropped position, whereby every cropped region can be checked sequentially to locate the correct position of said film;
   wherein if in step I the frames are not detected, then the steps described steps 2a~2d in process II are carried out to crop the films regions properly.

6. The method as claimed in claim 5, wherein the frame detection step I comprises the following sub-steps:

1a. processing all pixels in a preview window to obtain a low threshold and a high threshold;

1b. comparing the pixels in every horizontal row with said low threshold, and respectively recording the number of the pixels that exceed said low threshold to obtain a dot-intension number with respect to every row, then comparing the dot-intension number of every row with a limit, thereby cropping the rows with dot-intension numbers that exceed said limit, and recording the row number of every cropped regions;

1c. transforming the size of the regions for disposing films into pixel dots; and 1d. comparing every one of said horizontal row number recorded with said pixel dot-number of the region for disposing a film, and if the difference between at least two of said horizontal row numbers and said dot-number is within a specific range then frames are detected.

7. The method as claimed in claim 5, wherein the image-division method comprises the following steps:

a. selecting a plurality of initial values with respect to a plurality of sets one to one to serve as the central characteristic values of said sets;

b. calculating the color values of every pixel to obtain the pixel characteristic values corresponding to every pixel;

c. calculating every said pixel characteristic value with said central characteristic values by subtraction and continuously taking the absolute values, thereby selecting the central characteristic value closest to said pixel characteristic value, whereby every pixel characteristic value is put into the corresponding set of the central characteristic value, that is closest to the pixel characteristic value;

d. averaging the pixel characteristic values in every set respectively to obtain corresponding mean characteristic values; and e. comparing every said mean characteristic value in every set with the corresponding central characteristic value, if every difference is within a specific range, then the minimal mean characteristic value serves as said low threshold, and the maximal mean characteristic value serves as said high threshold, and if at least one of the differences exceeds said specific range, then every central characteristic value of said sets is replaced by said mean characteristic values of said sets, then the steps c, d, and e are iterated.

8. The method as claimed in claim 5, wherein, after confirming the type of films in step I, if said films are negative, then said prescanned image is subjected to a reversal operation first, and the frame detection process is carried out successively; while if said films are positive, then the frame detection is carried out successively without a reversal operation.

9. The method as claimed in claim 5, wherein if the films are negative, then said prescanned image is subjected to a reversal operation, and the cropping process are carried out successively; while if the films are positive, then the cropping process are carried out to said prescanned image without a reversal operation.

* * * * *